Dec. 22, 1964  D. H. BEISEL  3,162,466
VEHICLE WHEEL SUSPENSION HAVING SPRING RATE ADJUSTMENT FEATURE
Filed Dec. 4, 1961

DONALD H. BEISEL
INVENTOR.

BY John R. Faulkner
Clifford L. Sadler

ATTORNEYS

United States Patent Office 3,162,466
Patented Dec. 22, 1964

3,162,466
VEHICLE WHEEL SUSPENSION HAVING SPRING RATE ADJUSTMENT FEATURE
Donald H. Beisel, Royal Oak, Mich., assignor to Ford Motor Company, Dearborn, Mich., a corporation of Delaware
Filed Dec. 4, 1961, Ser. No. 156,632
8 Claims. (Cl. 280—124)

The present invention relates to vehicle suspension systems and more particularly to a suspension system having means for changing the static loading of the suspension springs.

It is well known in automotive suspension design that it is highly desirable to have means for compensating for loading changes in order to maintain the vehicle at its design height. The conventional suspension having load compensating construction employs auxiliary springs that can be controlled to accommodate additional loads placed upon the vehicle. Unfortunately, certain expense and design problems result from the use of auxiliary springs.

Therefore, it is the principal object of this invention to provide a simplified, economical suspension construction that is actuatable to vary the loading of the main suspension springs in order to compensate for changes in vehicle loading.

More specifically, one embodiment of the present invention employs a pair of longitudinal leaf springs in a Hotchkiss suspension that are loadable in torsion to change the spring rate in order to compensate for changes in the load condition of the vehicle.

The objects and advantages of the present invention will be more fully comprehended from the following discussion and the accompanying drawings, in which.

Figure 1:
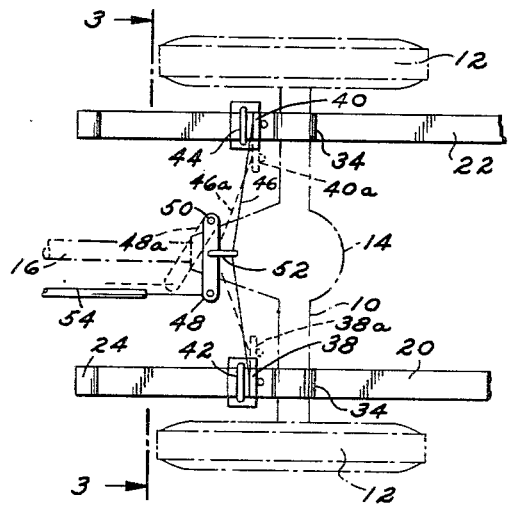
FIGURE 1 is a top plan view of a vehicle suspension incorporating the presently preferred embodiment of this invention.
Figure 2:
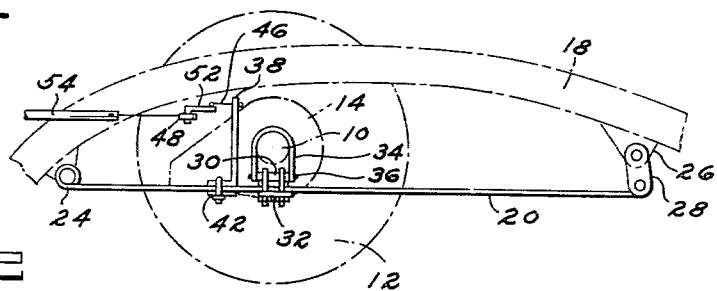
FIGURE 2 is a side elevational view of the construction of FIGURE 1.

Referring now to the drawings, FIGURE 1 discloses an embodiment of the present invention incorporated in the rear suspension of a motor vehicle. An axle housing 10 has a pair of left and right road wheels 12 situated at the outer ends thereof. A differential gear unit 14 is disposed centrally in the axle housing 10 and receives power from a drive shaft 16 for distribution to the wheels 12.

The body of the vehicle includes chassis frame side rail 18 and is resiliently mounted on the axle 10 by means of a pair of longitudinally extending left and right leaf springs 20 and 22. The spring 20 is secured at its forward end to the frame 18 by means of a rubber bushing 24. The rear end of the spring 20 is secured to a frame mounted bracket 26 by means of a shackle 28. Right spring 22 is similarly connected to the vehicle chassis.

The springs 20 and 22 are formed from a single band of leaf spring material and are thus distinguishable from the conventional leaf spring that comprises a laminated series of spring metal layers.

A central portion of the springs 20 and 22 have a pivotal connection with the axle housing 10. A cylindrical bushing 30 is secured to the left leaf spring 20 by appropriate means such as U-bolts 32. The axle housing 10 is provided with a pair of depending pivot brackets 34 that are pivotally connected to the bushing 30 by a pivot bolt 36. The connecting construction for the right side is identical.

The shackle connection 28 and forward bushing 24 have transverse pivot axes to permit the axle housing 10 to move and the springs 20, 22 to flex in a vertical path as dictated by jounce and rebound wheel movement. The pivotal connection between the spring 20 and axle housing 10 has a longitudinal pivot axis concentric with the bushing 30.

In accordance with the present invention, the vehicle suspension just described is provided with means for changing the spring rate to compensate for load changes. A pair of vertical load levers 38 and 40 are secured to the right and left leaf springs 20 and 22 respectively. The levers 38 and 40 are generally L-shaped and have a foot portion rigidly connected to the leaf springs 20, 22 by U-bolts 42 and 44 respectively. The major portion of the levers 38 and 40 extend vertically upwardly and have their upper ends interconnected by a taut cable 46.

A cross bar 48 has a pivotal connection at 50 on an unsprung member such as a bracket 51 extending from the differential housing 14. A link 52 extends from the midportion of the bar 48 and engages the center of the cable 46. The left hand end of the bar 48 is secured to an operating cable 54. Thus, the bar 48 constitutes a second class lever actuatable by the cable 54.

Figure 3:
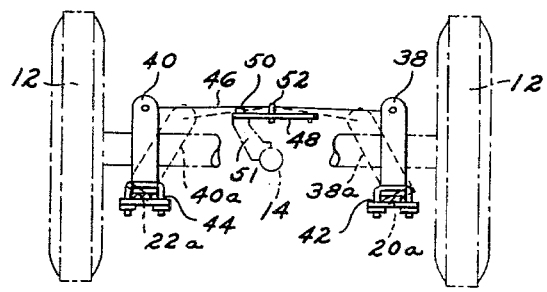
FIGURE 3 is a sectional view taken along section lines 3—3 of FIGURE 1.

From this structure it is apparent that when the operating cable 54 is drawn forwardly to cause the bar 48 to pivot about the connection 50, the bar will assume a position indicated by reference numeral 48a. At the same time, the cable 46 will be pulled to assume the dotted line position 46a. The drawing of the central portion of the cable 46 forwardly will cause the load levers 38 and 40 to be pulled inwardly to the dotted line position 38a and 40a as indicated in FIGURE 3. The operating cable 54 may be actuated by either a manual device adjacent to the driver or by a power operated mechanism.

When the levers 38 and 40 are rotated to the position 38a and 40a, the central portion of the springs 20, 22 assume an orientation 20a and 22a. Because the ends of the springs 20, 22 are connected to the frame by devices having only transverse pivot axes, a twist will be introduced into the springs. The pivotal connection between the springs 20, 22 and the axle housing 10 permits them to be freely rotated at that point.

Thus, the rotating of the levers 38 and 40 will impart a twist to the leaf springs 20 and 22. The twisting stresses the springs 20 and 22, causing their spring rates to be increased, making them stiffer. The change in spring rate can be used to compensate for load changes to perform a leveling of the vehicle. When the mechanism is used to level a vehicle, the change in spring rate will automatically be proportionate to the change in wheel load and satisfy the requirements for constant frequency regardless of load.

The foregoing description presents the presently preferred embodiment of this invention. Modifications and alterations may occur to those skilled in the art that will come within the scope and spirit of the following claims.

I claim:

1. A vehicle suspension having sprung and unsprung components, a suspension spring interconnecting said components, said spring being adapted to be loaded in both bending and torsion modes, said spring supporting the weight of said sprung components when loaded in one of said modes, means constructed for stressing said spring to change its spring rate in said one mode by loading said spring in the other of said modes.

2. A vehicle suspension having sprung and unsprung components, a pair of suspension springs interconnecting said components, said springs being adapted to be loaded in both bending and torsion modes, said springs supporting the weight of said sprung components when loaded in one of said modes, means interconnecting said pair of springs and constructed for stressing said springs to change their spring rates in said one mode by loading said springs in the other of said modes.

3. A vehicle suspension having sprung and unsprung components, a pair of longitudinally extending leaf springs supporting said sprung components upon said unsprung components in bending, a load lever secured to each of said springs, said levers being connected to an actuatable device adapted to rotate said levers and impart a twist to each of said springs.

4. A vehicle suspension having sprung and unsprung components, a pair of longitudinally extending single leaf springs supporting said sprung components upon said unsprung components in bending, a load lever secured to each of said springs, means adapted to rotate said levers in opposite directions to impart a twist to each of said springs.

5. A vehicle suspension having sprung and unsprung components, a suspension spring interconnecting said components, said spring being adapted to be loaded in first and second modes, said spring supporting the weight of said sprung components when loaded in said first mode, means constructed for changing the spring rate of said spring in said first mode by loading said spring in said second mode.

6. A vehicle suspension having sprung and unsprung components, a pair of suspension springs interconnecting said components, said springs being adapted to be loaded in first and second modes, said springs supporting the weight of said sprung components when loaded in said first mode, means interconnecting said pair of springs and constructed for changing their spring rates in said first mode by loading said spring in said second mode.

7. A vehicle suspension having sprung and unsprung components, a suspension spring interconnecting said components, said spring being adapted to be loaded in both bending and torsion, said spring supporting the weight of said sprung components when loaded in bending, means constructed for loading said spring in torsion to change its spring rate in bending.

8. A vehicle suspension having sprung and unsprung components, a pair of suspension springs interconnecting said components, said springs being adapted to be loaded in both bending and torsion modes, said springs supporting the weight of said sprung components when loaded in bending, means interconnecting said pair of springs and constructed for stressing said springs in torsion to change their spring rates in bending.

References Cited in the file of this patent

UNITED STATES PATENTS

| | | |
|---|---|---|
| 2,224,717 | Austin | Dec. 10, 1940 |
| 2,840,390 | Walker | June 24, 1958 |
| 2,948,548 | Gill | Aug. 9, 1960 |
| 2,983,521 | Dauben | May 9, 1961 |